United States Patent
Kimura

(10) Patent No.: US 10,661,618 B2
(45) Date of Patent: May 26, 2020

(54) TIRE MANAGEMENT METHOD AND TIRE MANAGEMENT APPARATUS DETECTING TEMPERATURE OF TIRE AT PREDETERMINED INTERVALS

(71) Applicant: BRIDGESTONE CORPORATION, Tokyo (JP)

(72) Inventor: Takeshi Kimura, Kawasaki (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 91 days.

(21) Appl. No.: 15/767,399

(22) PCT Filed: Nov. 10, 2016

(86) PCT No.: PCT/JP2016/083413
§ 371 (c)(1),
(2) Date: Apr. 11, 2018

(87) PCT Pub. No.: WO2017/082362
PCT Pub. Date: May 18, 2017

(65) Prior Publication Data
US 2018/0304703 A1  Oct. 25, 2018

(30) Foreign Application Priority Data
Nov. 10, 2015 (JP) ................................. 2015-220413

(51) Int. Cl.
*B60C 23/20* (2006.01)
*B60C 11/24* (2006.01)
(Continued)

(52) U.S. Cl.
CPC .............. *B60C 23/20* (2013.01); *B60C 11/24* (2013.01); *B60C 11/246* (2013.01); *B60C 19/00* (2013.01);
(Continued)

(58) Field of Classification Search
None
See application file for complete search history.

(56) References Cited

U.S. PATENT DOCUMENTS

| 7,483,794 B2 | 1/2009 | Bocquillon et al. |
| 9,387,735 B2 * | 7/2016 | Lee ........................ B60W 30/02 |

(Continued)

FOREIGN PATENT DOCUMENTS

| CN | 1486865 A | 4/2004 |
| CN | 101001763 A | 7/2007 |

(Continued)

OTHER PUBLICATIONS

International Search Report for PCT/JP2016/083413, dated Dec. 20, 2016.

(Continued)

*Primary Examiner* — Natalie Huls
*Assistant Examiner* — Jermaine L Jenkins
(74) *Attorney, Agent, or Firm* — Sughrue Mion, PLLC

(57) ABSTRACT

The present tire management method includes detecting a temperature at predetermined intervals inside a tire air chamber, converting the temperature detected at predetermined intervals inside the tire air chamber into a first multiplication value of load times speed or a second multiplication value of the square of load times speed, and calculating an accumulation value by accumulating the first or second multiplication value for a predetermined period. The present tire management apparatus includes a temperature detector that detects a temperature at predetermined intervals inside a tire air chamber, a converter that converts the temperature detected by the temperature detector at predetermined intervals inside the tire air chamber into a first multiplication value of load times speed or a second multiplication value of the square of load times speed, and (Continued)

an accumulator that calculates an accumulation value by accumulating the first or second multiplication value for a predetermined period.

10 Claims, 4 Drawing Sheets

(51) Int. Cl.
    *B60C 19/00*     (2006.01)
    *G01M 17/02*     (2006.01)
    *G01N 17/00*     (2006.01)

(52) U.S. Cl.
    CPC ............ *G01M 17/02* (2013.01); *G01N 17/00* (2013.01); *B60C 2019/004* (2013.01); *B60C 2019/007* (2013.01)

(56) References Cited

U.S. PATENT DOCUMENTS

| | | | |
|---|---|---|---|
| 9,442,045 B2 * | 9/2016 | Singh | G01M 17/02 |
| 9,821,611 B2 * | 11/2017 | Singh | B60C 11/246 |
| 10,166,824 B2 * | 1/2019 | Notomi | B60C 23/0479 |
| 2004/0050151 A1 | 3/2004 | Kojima | |
| 2004/0261511 A1 * | 12/2004 | Shepherd | B60C 23/20 73/146 |
| 2006/0156790 A1 | 7/2006 | Bocquillon et al. | |
| 2007/0240502 A1 | 10/2007 | Morinaga et al. | |
| 2009/0299656 A1 | 12/2009 | Koguchi | |
| 2010/0319446 A1 | 12/2010 | Coue | |
| 2012/0109449 A1 | 5/2012 | Boehme et al. | |
| 2014/0067193 A1 | 3/2014 | Gokyu et al. | |
| 2015/0239298 A1 | 8/2015 | Kretschmann | |
| 2016/0229234 A1 | 8/2016 | Sudou | |

FOREIGN PATENT DOCUMENTS

| | | | | |
|---|---|---|---|---|
| CN | 201004038 Y | 1/2008 | | |
| CN | 101528486 A | 9/2009 | | |
| CN | 101596846 A | 12/2009 | | |
| CN | 102529603 A | 7/2012 | | |
| CN | 104781092 A | 7/2015 | | |
| DE | 102013220882 A1 | 4/2015 | | |
| FR | 2856343 A1 | 12/2004 | | |
| JP | 09309304 A | * 12/1997 | ............ | B60C 23/20 |
| JP | 2007-168671 A | 7/2007 | | |
| JP | 2012-116417 A | 6/2012 | | |
| JP | 2013-169816 A | 9/2013 | | |
| JP | 2014-046879 A | 3/2014 | | |
| WO | 2014053322 A1 | 4/2014 | | |
| WO | 2015/040745 A1 | 3/2015 | | |

OTHER PUBLICATIONS

Communication dated Aug. 21, 2018 from the European Patent Office in counterpart application No. 16864323.7.
Su Hong-bin, "Analysis on TKPH Test Method for Off-the-road Tire", Double Coin Heavy-Duty Tire Co., Ltd., Shanghai, 200245, China, 2014, vol. 34, pp. 584-586 (9 pgs. total).
Search Report dated Feb. 6, 2020, issued by the China National Intellectual Property Administration in application No. 201680065814.0.

* cited by examiner

TIRE MANAGEMENT METHOD AND TIRE MANAGEMENT APPARATUS DETECTING TEMPERATURE OF TIRE AT PREDETERMINED INTERVALS

This application is a National Stage of International Application No. PCT/JP2016/083413 filed Nov. 10, 2016, claiming priority based on Japanese Patent Application No. 2015-220413 filed Nov. 10, 2015.

TECHNICAL FIELD

The present disclosure relates to a tire management method and a tire management apparatus.

BACKGROUND

For pneumatic tires used in construction and mining vehicles, tire life has conventionally been predicted, for example, by evaluating the amount of wear, the durability, and the like on the basis of information on the tire internal pressure measured by an internal pressure sensor mounted inside the pneumatic tire, information on the vehicle running speed and load applied to the tire obtained from vehicle sensors, and the like. For example, one method for estimating the amount of wear of such a pneumatic tire is a method to estimate the amount of wear of the tire tread from the tire radial acceleration detected using an accelerometer, as in patent literature (PTL) 1.

CITATION LIST

Patent Literature

PTL 1: JP 2013-169816 A

SUMMARY

Technical Problem

On the other hand, a tire pressure monitoring system (TPMS) is typically used, for example, to monitor the air pressure of a pneumatic tire. The TPMS issues an alarm when the air pressure of the pneumatic tire (tire internal pressure) has dropped more than an allowable range. In such a TPMS, the temperature inside the tire is often measured along with the tire internal pressure.

It would be helpful to use this temperature inside the tire to identify the status of the pneumatic tire accurately, but no conventional technique does so.

An aim of the present disclosure is to provide a tire management method and a tire management apparatus that can easily identify the usage status of a pneumatic tire on the basis of the temperature inside the tire.

Solution to Problem

To achieve the aforementioned aim, a tire management method according to the present disclosure comprises:

detecting, with a temperature detector, a temperature at predetermined intervals inside a tire air chamber of a pneumatic tire on a vehicle;

converting, with a converter, the temperature detected at predetermined intervals inside the tire air chamber into a first multiplication value that is the product of load applied to the tire and tire speed or a second multiplication value that is the product of the square of load applied to the tire and tire speed; and calculating, with an accumulator, an accumulation value by accumulating the first multiplication value or the second multiplication value for a predetermined period.

To achieve the aforementioned aim, a tire management apparatus according to the present disclosure comprises:

a temperature detector configured to detect a temperature at predetermined intervals inside a tire air chamber of a pneumatic tire on a vehicle;

a converter configured to convert the temperature detected by the temperature detector at predetermined intervals inside the tire air chamber into a first multiplication value that is the product of load applied to the tire and tire speed or a second multiplication value that is the product of the square of load applied to the tire and tire speed; and an accumulator configured to calculate an accumulation value by accumulating the first multiplication value or the second multiplication value for a predetermined period.

Advantageous Effect

According to the present disclosure, a tire management method and a tire management apparatus that can easily identify the usage status of a pneumatic tire on the basis of the temperature inside the tire can be provided.

DETAILED DESCRIPTION

The following describes an embodiment of the present disclosure with reference to the drawings.

Figure 1:
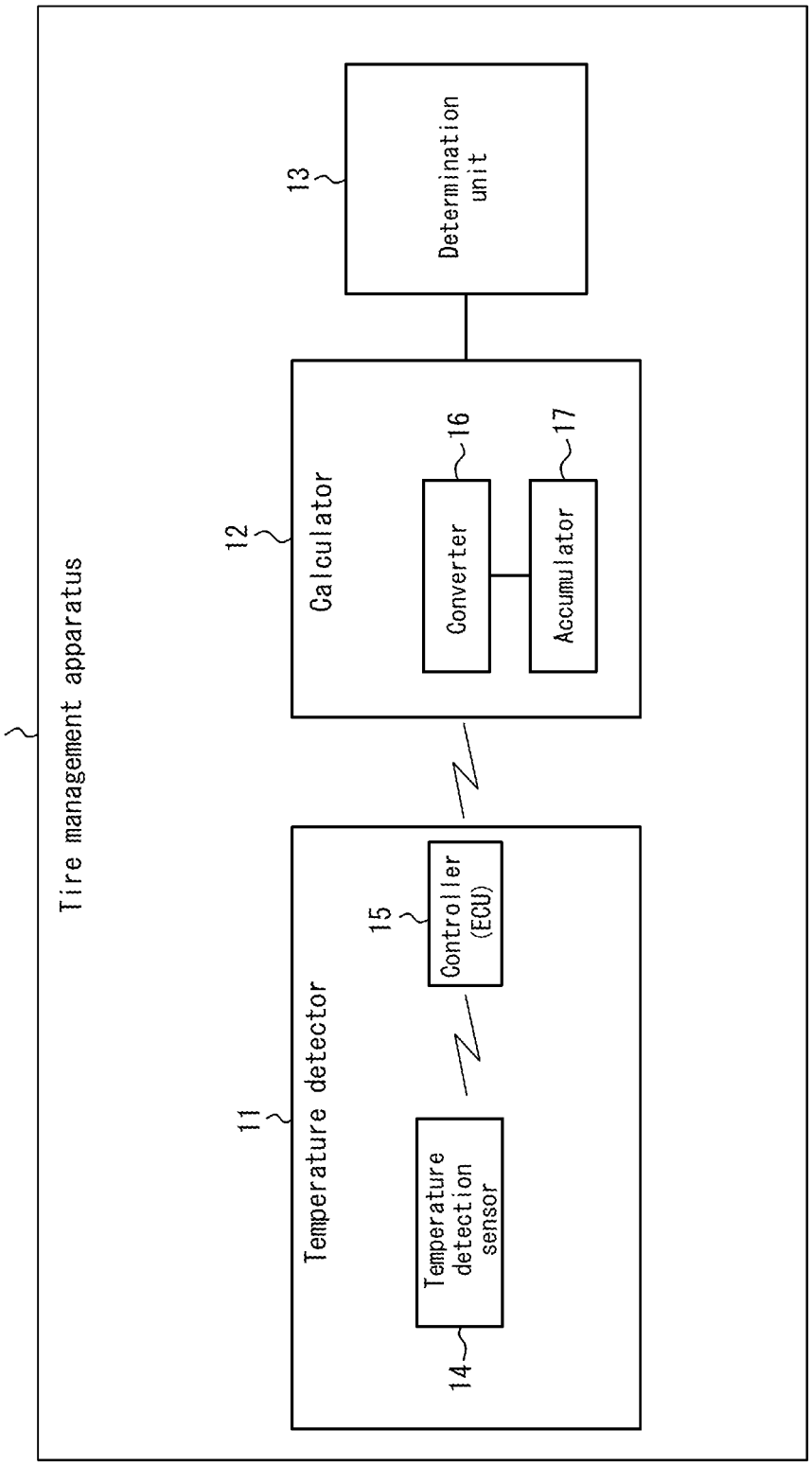
FIG. 1 is a block diagram schematically illustrating the structure of a tire management apparatus according to an embodiment of the present disclosure.

FIG. 1 is a block diagram schematically illustrating the structure of a tire management apparatus according to an embodiment of the present disclosure. As illustrated in FIG. 1, a tire management apparatus 10 according to the present embodiment includes a temperature detector 11, a calculator 12, and a determination unit 13, and manages the current usage status of a pneumatic tire on the basis of information from the calculator 12. In this example, the pneumatic tire is a heavy-duty pneumatic tire (also referred to below simply as a tire), a large-scale pneumatic tire (or tire) used in construction and mining vehicles or the like.

In the present embodiment, the vehicle to which tires managed by the tire management apparatus 10 are attached is a six-wheeled vehicle, with two front wheels and four back wheels. The tires are used in a regular usage pattern by using a new tire for approximately ⅓ of the tire lifespan on a front wheel and then using the tire for the remaining ⅔ on the rear wheel.

The temperature detector 11 includes, for example, a temperature detection sensor 14 that detects the temperature inside the tire air chamber and a controller (ECU) 15 loaded in the vehicle. In the present embodiment, the temperature detection sensor 14 is disposed in each of the vehicle's six tires that are to be managed but need not be disposed in each of the six tires and may instead be disposed in one to fewer than six tires as necessary. These tires may then be managed.

In the present embodiment, the temperature detection sensor 14 is provided as a portion of a tire pressure monitoring system (TPMS) that issues an alarm when determining, on the basis of information on the air pressure or temperature inside the tire, that the air pressure has dropped more than an allowable range. This temperature detection sensor 14 can also detect air pressure along with the temperature.

The present embodiment uses six temperature detection sensors 14 and the controller 15 for transmission, by wireless communication, to the controller 15 of information on at least the temperature inside the tire as detected by the six temperature detection sensors 14.

Here, I confirmed that the temperature detected by the TPMS is not largely caused by heat of the upper portion of the tire belt. Rather, it is clear from the results of detailed temperature measurements of a tire that the TPMS mainly detects the temperature caused by heat of the tire case. Hence, I have used the temperature of the tire case detected by the TPMS.

One of the six temperature detection sensors 14 is mounted inside the tire air chamber in each tire on the vehicle (six wheels, i.e. two front wheels and four back wheels), for example on the tire inner surface, the rim base, or the like. As information related to the temperature caused by heat of the tire case, each temperature detection sensor 14 detects the temperature at predetermined intervals inside the tire air chamber of a pneumatic tire on the vehicle. A belt and carcass are included in the tire case from which the detected temperature is acquired. For durability, the sensor is preferably mounted at a location on the inner side surface of the tire bead core.

The controller (ECU) 15 in the present embodiment outputs temperature information detected at predetermined intervals inside the tire air chamber of six tires, as input from the six temperature detection sensors 14, to the calculator 12 by wireless communication (for example, 3G, Wi-Fi, or the like).

The calculator 12 has a converter 16 and an accumulator 17, uses the converter 16 to convert the temperature information, input to the calculator 12, that was detected at predetermined intervals inside the tire air chamber of the tires, and uses the accumulator 17 to accumulate the result.

In the present embodiment, the converter 16 is provided in advance with unique conversion formulas and converts the temperature information detected by each temperature detection sensor 14 at predetermined intervals inside the tire air chamber into a tire ton-km per hour (TKPH) rating system, which is a multiplication value that is the product of the load (average load) and speed (average speed) of the tire, or into tire $T^2KPH$, which is a multiplication value that is the product of the load squared (average load squared) and the speed (average speed) of the tire. As the conversion formulas, a front tire conversion formula is used for the front tires and a rear tire conversion formula is used for the rear tires.

The unique conversion formula provided in the converter 16 is, for example, based on vehicle type, tire type, tire size, tire tread pattern, tire case structure, or the like but is not limited to these examples.

In the present embodiment, the front tire conversion formula and rear tire conversion formula are each based on either tire TKPH or tire $T^2KPH$, for example as follows.

<Front Tire Conversion Formula>

$TKPH = (\text{detected temperature} - \alpha)/\beta$ $T^2KPH = (\text{detected temperature} - \gamma)/\delta$ <Rear Tire Conversion Formula>

$TKPH = (\text{detected temperature} - \varepsilon)/\xi$ $T^2KPH = (\text{detected temperature} - \eta)/\sigma$ Here, $\alpha$, $\beta$, $\gamma$, $\delta$, $\varepsilon$, $\xi$, $\eta$, and $\sigma$ are coefficients based on the vehicle type, tire type, tire size, tire tread pattern, tire case structure, and the like listed above as examples.

The reason for using different conversion formulas for the front tires and the rear tires is that the load differs on the front and back tires for tires typically mounted on a vehicle, in particular for heavy-duty tires used in construction and mining vehicles.

In the present embodiment, the accumulator 17 accumulates, for a predetermined period, the multiplication value input from the converter 16, i.e. the value converted into tire TKPH or tire $T^2KPH$. The accumulation for a predetermined period is, for example, carried out by accumulating the value detected at each fixed time interval over a predetermined period.

This accumulator 17 first calculates the accumulation for a predetermined period during front mounting of the corresponding tire, i.e. during use as a front tire, and records the front accumulation result.

Next, the accumulator 17 calculates the accumulation for a predetermined period during rear mounting of the corresponding tire, i.e. during use as a rear tire, and records the rear accumulation result. Subsequently, the accumulator 17 adds the front accumulation result and the rear accumulation result to obtain an addition result from the start of use of the corresponding tire until the present and outputs this addition result to the determination unit 13. The accumulator 17 performs the aforementioned addition process to obtain the addition result from the start of use of the corresponding tire until the present for all six tires and outputs the addition result for each of the six tires to the determination unit 13.

On the basis of the addition result of a managed tire as input from the accumulator 17, the determination unit 13 determines the current status of the corresponding tire. The determination may, for example, be made by preparing data on the tire lifespan (tire life) assumed in advance for the tire and then presenting, as the determination result, the current tire usage status derived from the addition result on the basis of the data, such as whether continued use is possible or the predicted length of time that use can be continued.

In the present embodiment, the calculator 12 and the determination unit 13 are, for example, implemented as functional components constituted by a computer for vehicle control loaded in a vehicle. The tire condition is managed on the basis of the determination in the computer for vehicle control.

In this way, the tire management apparatus of the present embodiment can easily identify the usage status of the pneumatic tire on the basis of the temperature of the air inside the tire air chamber. This temperature of the air inside the tire air chamber can be obtained from information from the TPMS provided in the vehicle.

Next, a tire management method according to the tire management apparatus 10 of the present embodiment is described.

Figure 2:
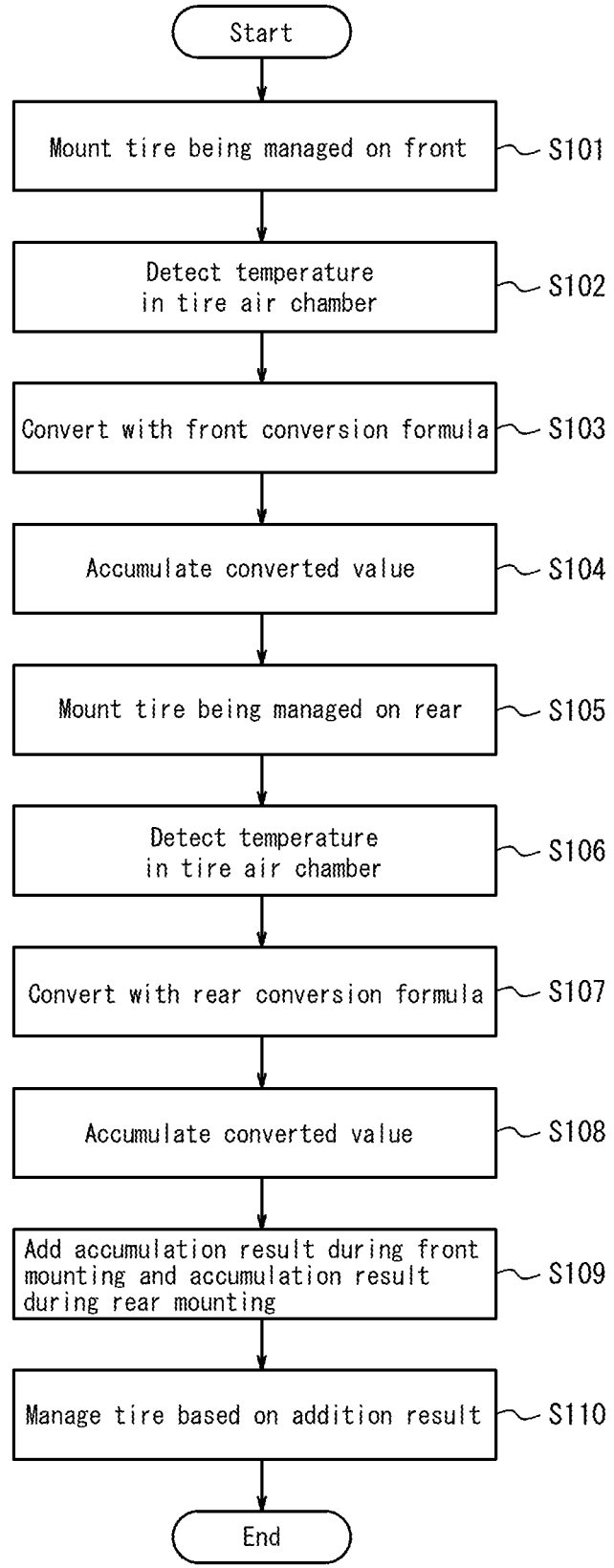
FIG. 2 is a flowchart illustrating a tire management method according to an embodiment of the present disclosure using the tire management apparatus of FIG. 1.

FIG. 2 is a flowchart illustrating a tire management method according to an embodiment of the present disclosure using the tire management apparatus of FIG. 1. As illustrated in FIG. 2, first, a heavy-duty pneumatic tire being managed by the tire management apparatus 10 is attached to the front left side, for example, of a vehicle (step S101) and used as a front tire. This vehicle has six tires, two on the front wheels and four on the back wheels. The tire being managed is a new tire and is used in a regular usage pattern by being used for approximately ⅓ of the tire lifespan on a front wheel and then being used for the remaining ⅔ on a rear wheel.

Next, in temperature detector 11, the temperature is detected at predetermined intervals inside the tire air chamber of the tire being managed using the temperature detection sensor 14, of the TPMS, embedded in the tire being managed (front tire) (step S102). The detected temperature information is output to the calculator 12 through the controller (ECU) 15 by wireless communication.

Next, in the calculator 12, a front tire conversion formula is used to convert the temperature detected by the temperature detector 11 at predetermined intervals inside the tire air chamber into a multiplication value that is the product of load applied to the tire and tire speed or a multiplication value that is the product of the square of load applied to the tire and tire speed (step S103), the converted multiplication value is accumulated for a predetermined period (step S104), and the accumulation result is recorded as the front accumulation result.

Subsequently, after the heavy-duty pneumatic tire being managed is used for approximately ⅓ of the tire life on a front wheel, the tire is attached to the rear left side, for example, of the vehicle (step S105) and used as a rear tire.

Next, in the temperature detector 11, the temperature is detected at predetermined intervals inside the tire air chamber of the tire being managed using the temperature detection sensor 14, of the TPMS, embedded in the tire being managed (rear tire) (step S106). The detected temperature information is output to the calculator 12 through the controller (ECU) 15 by wireless communication.

Next, in the calculator 12, a rear tire conversion formula is used to convert the temperature detected by the temperature detector 11 at predetermined intervals inside the tire air chamber into a multiplication value that is the product of load applied to the tire and tire speed or a multiplication value that is the product of the square of load applied to the tire and tire speed (step S107), the converted multiplication value is accumulated for a predetermined period (step S108), and the accumulation result is recorded as the rear accumulation result.

Subsequently, the front accumulation result that is the accumulation result during front mounting and the rear accumulation result that is the accumulation result during rear mounting are added for the tire being managed (step S109). In this way, the addition result of the multiplication values from the start of use of the tire being managed until the present can be obtained. The obtained addition result is output to the determination unit 13.

The determination unit 13 prepares data on the lifespan (tire life) assumed in advance for the tire being managed and presents, as the determination result, the current tire usage status derived from the addition result on the basis of the data, such as whether continued use as possible or the predicted length of time that use can be continued. The determination unit 13 may present the determination result for all of the tires being managed, i.e. for all six tires mounted on the vehicle in the tire management method of the present embodiment.

With the tire management method of the present embodiment, the determination result of the determination unit 13 thus reveals how much longer a tire can be used and what the remaining tire lifespan (tire life) is at the current time for the current usage status of the tire. Therefore, by determining that the tire usage limit is near when the sum of front wheel use and rear wheel use becomes a preset value of higher, for example, the subsequent tire lifespan can be predicted, and the assumed remaining usage time can be presented.

In other words, the tire management apparatus 10 of the present embodiment can implement the tire management method of the present embodiment, can obtain information on the temperature inside the tire air chamber from temperature/pressure data of the tire being managed, which is monitored in real time by a TPMS, and can easily identify the current usage status of the tire on the basis of the information on the temperature inside the tire air chamber. Accordingly, a tire management method for effectively managing a tire in accordance with the usage status can be achieved.

In the present embodiment, the vehicle to which tires being managed are attached is not limited a six-wheeled vehicle and may, for example, be a four-wheeled vehicle. Also, instead of managing tires on all six wheels, tires may be managed one wheel at a time. The tire being managed is not limited to being used on a back wheel after being used on a front wheel and may instead be used only in the same position. The coefficients used in the front tire conversion formula and the rear tire conversion formula may be corrected using internal pressure based on data on various internal pressures inside the tire air chamber.

Figure 3:
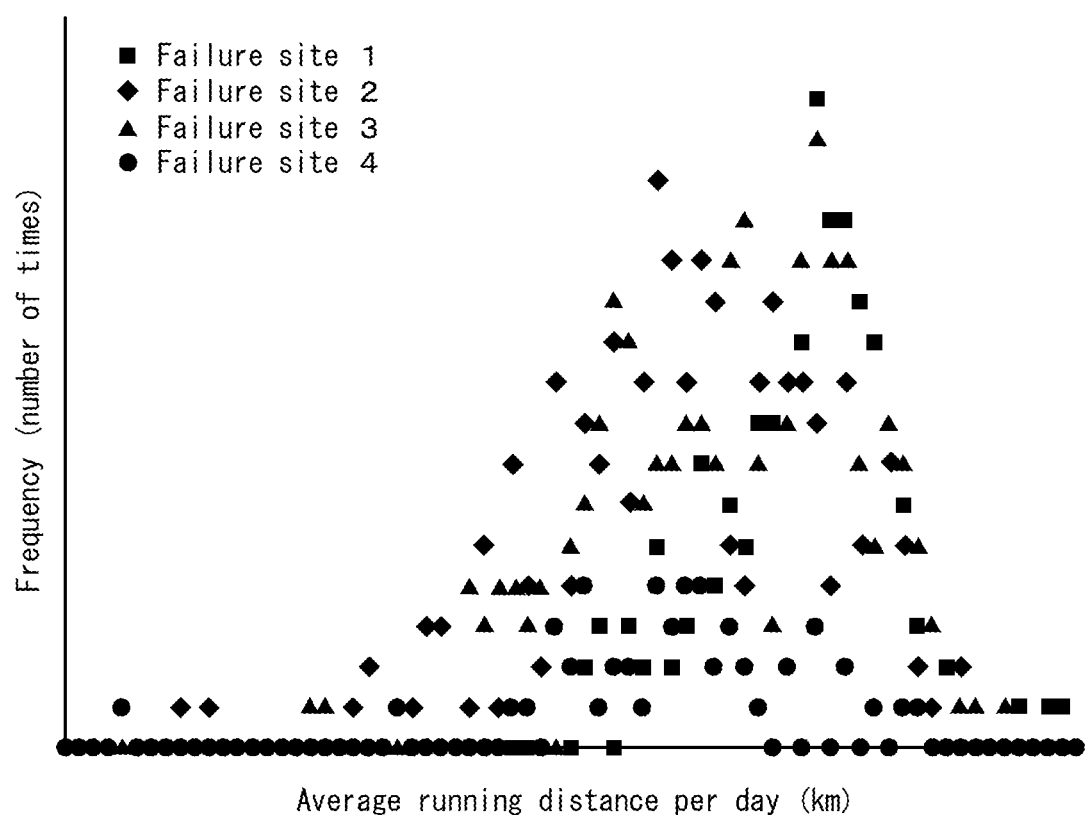
FIG. 3 illustrates the relationship between the average running distance per day and the failure frequency for each one of failure sites 1 to 4.

FIG. 3 illustrates the relationship between the average running distance per day and the failure frequency for each one of failure sites 1 to 4. As illustrated in FIG. 3, the average running distance per day and the failure frequency are correlated. For example, for failure site 1, the frequency of occurrence is low (no occurrence in FIG. 3) when the average running distance per day is sort. Therefore, when the average running distance per day is short, failure sites 2 to 4 can be considered as sites with possible failure. Normally, the speed (average speed) for calculating TKPH or $T^2KPH$ is calculated by dividing the average running distance per day by 24 hours. Therefore, TKPH or $T^2KPH$ and the failure site are correlated. Furthermore, the TKPH or $T^2KPH$ calculated with the aforementioned conversion formulas and the failure site are also correlated. Accordingly, in the apparatus of the present disclosure, the determination unit 13 is preferably configured to determine a predicted failure site of a pneumatic tire on the basis of the aforementioned sum and a failure map, prepared in advance, indicating the relationship between the aforementioned sum and one or more failure sites. This is because the site of predicted failure can easily be identified on the basis of the temperature inside the tire. Similarly, in the method of the present disclosure, the determination unit 13 preferably determines a predicted failure site of a pneumatic tire on the basis of the aforementioned sum and a failure map, prepared in advance, indicating the relationship between the aforementioned sum and one or more failure sites.

Figure 4:
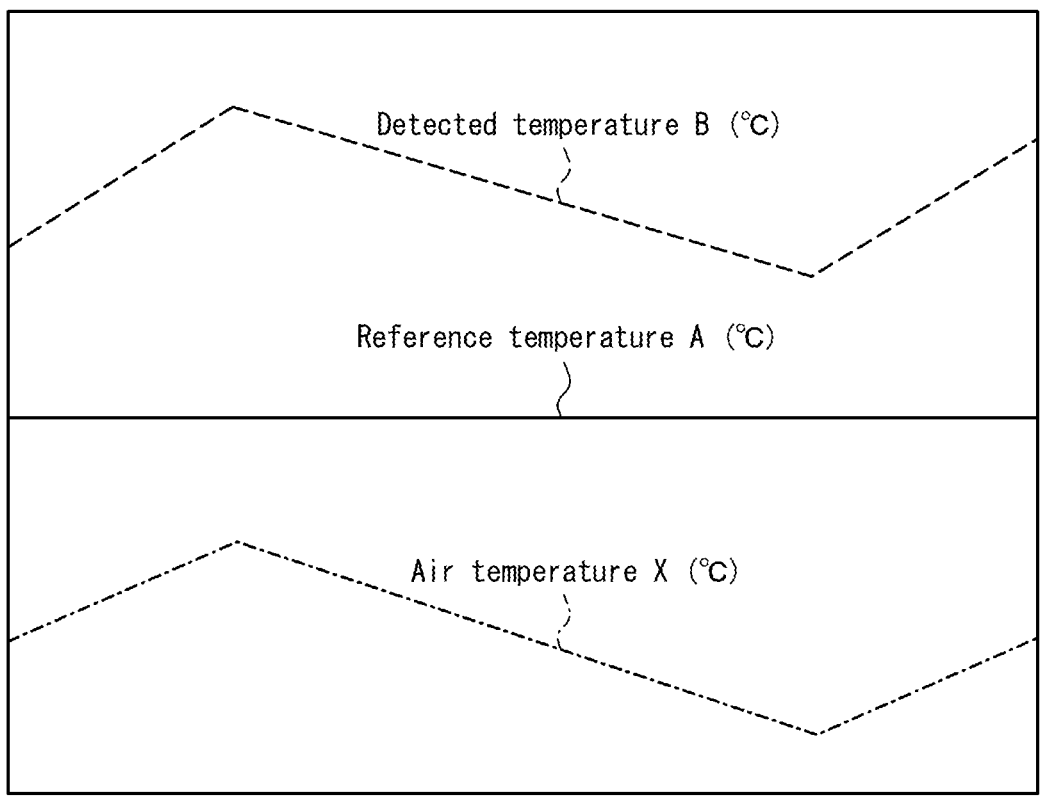
FIG. 4 illustrates the detected temperature, reference temperature, and air temperature.

FIG. 4 illustrates the detection temperature, reference temperature, and air temperature. In the present disclosure, the detected temperature can be corrected using the air temperature at the point in time when the temperature is detected. In other words, as illustrated schematically in FIG.

4, it is thought that the actual temperature is detected higher or lower depending on whether the air temperature is high or low. Therefore, using the following formula, for example, a corrected temperature is preferably used instead of the detected temperature.

corrected temperature=detected temperature $B(° C.)$+ ((reference temperature $A(° C.)$−air temperature $X(° C.)$))

REFERENCE SIGNS LIST

10 Tire management apparatus
11 Temperature detector
12 Calculator
13 Determination unit
14 Temperature detection sensor
15 Controller (ECU)
16 Converter
17 Accumulator

The invention claimed is:

1. A tire management method comprising:
    detecting, by a temperature detector, a temperature at predetermined intervals inside a tire air chamber of a pneumatic tire on a vehicle;
    converting, by a converter, the temperature detected at predetermined intervals inside the tire air chamber into a first multiplication value being obtained by multiplying load applied to the tire by tire speed or a second multiplication value being obtained by multiplying the square of the load applied to the tire by the tire speed; and
    calculating, by an accumulator, an accumulation value by accumulating the first multiplication value or the second multiplication value for a predetermined period.

2. The tire management method of claim 1, further comprising calculating, by the accumulator, a sum by adding the accumulation value for the predetermined period during the pneumatic tire being used as a front tire and the accumulation value for the predetermined period during the pneumatic tire being used as a rear tire.

3. The tire management method of claim 2, further comprising determining, by a determination unit, a usage status of the pneumatic tire from the sum based on tire life data prepared in advance.

4. The tire management method of claim 3, wherein by the determination unit, a predicted failure site of the pneumatic tire is determined based on:
    the sum, and
    a failure map, prepared in advance, indicating a relationship between the sum and one or more previously determined failure sites.

5. The tire management method of claim 1, wherein the pneumatic tire comprises a heavy-duty pneumatic tire.

6. A tire management apparatus comprising:
    a temperature detector configured to detect a temperature at predetermined intervals inside a tire air chamber of a pneumatic tire on a vehicle;
    a converter configured to convert the temperature detected by the temperature detector at predetermined intervals inside the tire air chamber into a first multiplication value being obtained by multiplying load applied to the tire by tire speed or a second multiplication value being obtained by multiplying the square of the load applied to the tire by tire speed; and
    an accumulator configured to calculate an accumulation value by accumulating the first multiplication value or the second multiplication value for a predetermined period.

7. The tire management apparatus of claim 6, wherein the accumulator is configured to calculate a sum by adding the accumulation value for the predetermined period during the pneumatic tire being used as a front tire and the accumulation value for the predetermined period during the pneumatic tire being used as a rear tire.

8. The tire management apparatus of claim 7, wherein the determination unit is configured to determine a usage status of the pneumatic tire from the sum based on tire life data prepared in advance.

9. The tire management apparatus of claim 8, wherein the determination unit is configured to determine a predicted failure site of the pneumatic tire based on:
    the sum, and
    a failure map, prepared in advance, indicating a relationship between the sum and one or more previously determined failure sites.

10. The tire management apparatus of claim 6, wherein the pneumatic tire comprises a heavy-duty pneumatic tire.

* * * * *